United States Patent
Satoh

Patent Number: 5,488,274
Date of Patent: Jan. 30, 1996

[54] METHOD FOR CONTROLLING ACTIVATION OF DISK DRIVE MOTORS

[75] Inventor: Masafumi Satoh, Kawasaki, Japan

[73] Assignee: Fujitsu Limited, Kawasaki, Japan

[21] Appl. No.: 98,704

[22] Filed: Jul. 28, 1993

[30] Foreign Application Priority Data

Jul. 28, 1992 [JP] Japan ................... 4-200810

[51] Int. Cl.⁶ .............................. H02P 1/54; G05B 11/01
[52] U.S. Cl. .......................... 318/101; 318/452; 318/625; 364/569; 364/143; 360/78.09
[58] Field of Search ..................... 364/478, 188, 364/570, 143, 167.01, 569, 625; 318/34, 66, 101, 102, 103, 445, 452; 360/73.01, 78.09

[56] References Cited

U.S. PATENT DOCUMENTS

| | | | |
|---|---|---|---|
| 4,653,034 | 3/1987 | Hoover et al. | 73/170 A |
| 4,678,979 | 7/1987 | Hori | 318/685 |
| 4,728,206 | 3/1988 | Mori et al. | 400/225 |
| 4,791,877 | 12/1988 | Horie et al. | 112/456 |
| 4,821,203 | 4/1989 | Carlton et al. | 364/478 |
| 4,922,363 | 5/1990 | Long et al. | 364/483 |
| 5,155,418 | 10/1992 | Kataoka | 318/116 |
| 5,157,505 | 10/1992 | Hasimoto et al. | 358/296 |
| 5,272,386 | 12/1993 | Kephart | 307/116 |

FOREIGN PATENT DOCUMENTS

| | | |
|---|---|---|
| 57-3265 | 1/1982 | Japan . |
| 3-49070 | 3/1991 | Japan . |

*Primary Examiner*—John W. Cabeca
*Attorney, Agent, or Firm*—Greer, Burns & Crain, Ltd.

[57] ABSTRACT

In a method of controlling activation of a motor, based on a device number (unit address) set value $A_d$ which is determined exclusively for a disk device and a motor activation start time delay $T_d$ which is designated by a host control device, a motor activation start time $T_s$ which corresponds to the physical device number is calculated in the disk device. The motor activation start time delay $T_d$ is set as a command in an interface between the disk device and the host control device. The method also requires that a nonvolatile memory is disposed in the disk device. The motor activation start time delay $T_d$ is stored in the nonvolatile memory when designated. In controlling activation of the motor later, the motor activation start time $T_s$ is calculated from the information which is stored in the nonvolatile memory.

6 Claims, 11 Drawing Sheets

| BUS BIT | TAG1 CYLINDER ADDRESS | TAG 2 HEAD ADDRESS / SPIN-UP DELAY VALUE | TAG 3 CONTROL SELECT | UNIT SELECT TAG |
|---|---|---|---|---|
| 0 | 1 | 1 / 1(S) | WRITE GATE | --- |
| 1 | 2 | 2 / 2(S) | READ GATE | --- |
| 2 | 4 | 4 / 4(S) | SERVO OFFSET PLUS | --- |
| 3 | 8 | 8 / 8(S) | SERVO OFFSET MINUS | --- |
| 4 | 16 | ("0") / 16(S) | FAULT CLEAR | --- |
| 5 | 32 | ("0") / ("0") | --- | --- |
| 6 | 64 | ("0") / ("0") | RTZ | --- |
| 7 | 128 | ("0") / ("0") | --- | |
| 8 | 256 | ("0") / ("0") | --- | |
| 9 | 512 | ("0") / ("1") | | |

DEFINITION OF Td

Fig. 10

| TAG 4 | FALSE ("0") | TRUE ("1") | FALSE ("0") | TRUE ("1") |
|---|---|---|---|---|
| TAG 5 | FALSE ("0") | FALSE ("0") | TRUE ("1") | TRUE ("1") |
| STATUS BIT | UNIT STATUS | SECTOR COUNT STATUS | FAULT/SEEK ERROR STATUS | DEVICE TYPE |
| 0 | UNIT READY | SECTOR ADDRESS 1 | FAULT 1 | DEVICE TYPE 1 |
| 1 | ON CYLINDER | SECTOR ADDRESS 2 | FAULT 2 | DEVICE TYPE 2 |
| 2 | SEEK ERROR | SECTOR ADDRESS 4 | FAULT 4 | DEVICE TYPE 4 |
| 3 | DEVICE CHECK | SECTOR ADDRESS 8 | SEEK ERROR 1 | DEVICE TYPE 8 |
| 4 | FILE PROTECTED | SECTOR ADDRESS 16 | SEEK ERROR 2 | DEVICE TYPE 16 |
| 5 | AM FOUND | SECTOR ADDRESS 32 | SEEK ERROR 4 | DEVICE TYPE 32 |
| 6 | INDEX | SECTOR ADDRESS 64 | VCM HEET | DEVICE TYPE 64 |
| 7 | SECTOR | SECTOR ADDRESS 128 | DCM FAULT | SPIN-UP DELAY ACT |

5,488,274

METHOD FOR CONTROLLING ACTIVATION OF DISK DRIVE MOTORS

BACKGROUND OF THE INVENTION

1. Field of the Invention

The present invention is related to a method for controlling the activation of a set of disk drive motors which can be used in a magnetic disk device, an optical disk device, and the like, and more particularly to a method for a motor activation control in which a motor activation start time delay is set at any desired value in the form of a command from a host control device and is applicable to any kind of subsystem in a flexible way.

2. Description of the Related Art

In a magnetic disk device, for example, a motor such as a spindle motor is used as is standard in the art. To activate the motor, the following two methods are available.

①: Letting the magnetic disk device itself start activating the motor after providing electric power to the magnetic disk device.

In this method, in the case where a plurality of magnetic disk devices are disposed in a magnetic disk subsystem, upon simultaneous supply of electric power to the plurality of magnetic disk devices, as many motor starting currents as the number of the magnetic disk devices are superimposed, thereby an extremely large load is created. There are two methods to avoid this as described below.

①-a: Delaying activation of the motor of each magnetic disk device by a predetermined time delay which is determined in accordance with the device number set value of the magnetic disk device.

①-b: Monitoring and controlling, in a power source unit of the magnetic disk subsystem, the time to supply electric power to the plurality of magnetic disk devices.

②: Letting the magnetic disk device start activating the motor which is mounted therein in response to a motor start command which is received from a host device, that is, a magnetic disk control device.

In this method, in the case where a plurality of magnetic disk devices are disposed in a magnetic disk subsystem, if the plurality of magnetic disk devices receive the motor start command at the same time, as many motor starting currents as the number of the magnetic disk devices are superimposed, thereby an extremely large load is created. As a method of preventing this, the following method is available.

②-a: Letting the magnetic disk control device supply the motor start command to the plurality of magnetic disk devices while monitoring an interval for supplying the motor start commands.

The conventional technique as described above has the following problems.

(1) In the case where a plurality of magnetic disk devices are disposed in a magnetic disk subsystem, if the motors of the plurality of magnetic disk devices are activated at the same time, as many motor staring currents as the number of the magnetic disk devices are superimposed, thereby an extremely large load is created.

Although the methods ①-a, ①-b and ②-a are available as solutions of the problem, any one of these methods must be designed exclusively for a particular subsystem, and therefore, is not flexible. Hence, these methods prohibit use of the magnetic disk devices or the power source unit of some manufacturers in some cases.

(2) As to the methods ①-a and ①-b, since motor activation start time delays are fixed in the magnetic disk devices, if the motor activation start time delays become inappropriate due to provision of an additional magnetic disk device or a change in the capacity of the power source unit, these methods cannot deal with the change in the situation.

(3) In the method ②-a, at every activation of the magnet disk devices, it is necessary to monitor the interval for supplying the motor start commands which are to be given to the respective magnetic disk devices all through the activation. Hence, while the interval for supplying the motor start commands is monitored, the magnetic disk control device cannot perform its other functions.

SUMMARY OF THE INVENTION

The present invention has been made to solve those problems which are inherent in these conventional methods. Therefore, an object of the present invention is to provide a motor activation control method which allows a host control device to designate any amount of a motor activation start time delay by means of a command and hence which is flexibly adaptive to any kind of subsystem.

In accordance with an aspect of the present invention, there is provided a method for controlling the activation of a plurality of disk drive motors provided in each magnetic disk unit wherein, based on a unit address set value $A_d$ which is determined exclusively for the disk unit, and a delay time of a motor activation start which is designated by a host control device as a spin-up delay time value $T_d$, a motor activation start time $T_s$ in response to the device number set value is calculated to thereby control activation of the motors the spin-up delay time value $T_d$ can be set in the form of a command via an interface between the disk device and the host control device.

PREFERRED EMBODIMENTS OF THE INVENTION

With reference to the drawings, an embodiment of the present invention will be described hereinafter.

Figure 1:
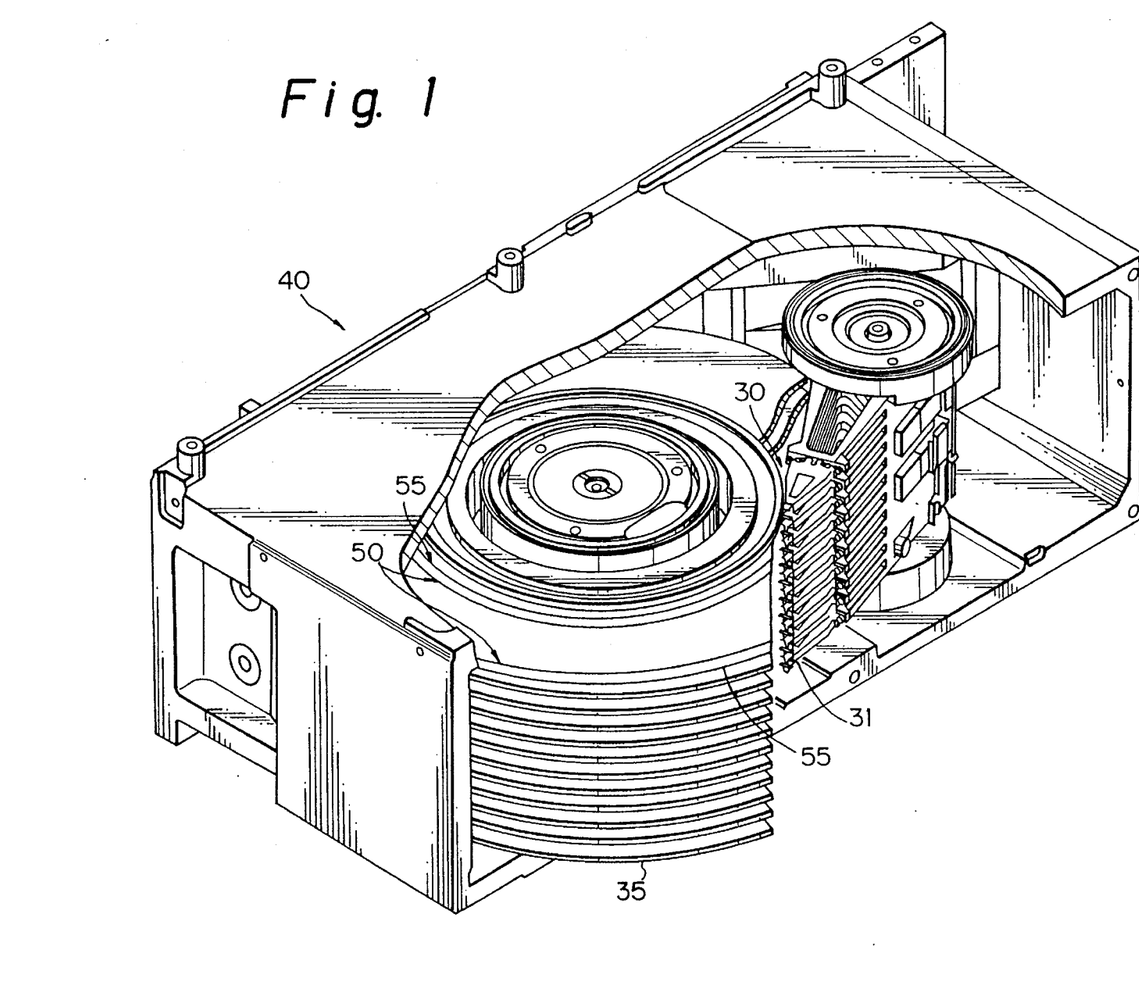
FIG. 1 is a partially cut-away perspective view showing the mechanism of a magnetic disk drive.

In order to facilitate understanding of an embodiment according to the present invention, a perspective view, partially cut away, showing a mechanism of one magnetic disk drive 40 is illustrated in FIG. 1. In this figure, a plurality of disks (e.g., eight disks) 35 are rotated simultaneously. The tracks on the recording surface of each disk 35 are written with a predetermined data pattern. However, the tracks at both ends of the inner zone and the outer zone of the disk 35 are formed as guard bands 50 in which particular patterns are written, instead of a data pattern, which particular pattern is used for stopping a seek operation of two kinds of heads 30 and 31. These heads 30 and 31 are provided on the upper and the lower surfaces of each disk 35, respectively. Further, at the inner and the outer sides of the guard band 50, erase zones 55 are formed for mechanically stopping the heads 30 and 31.

Figure 2:
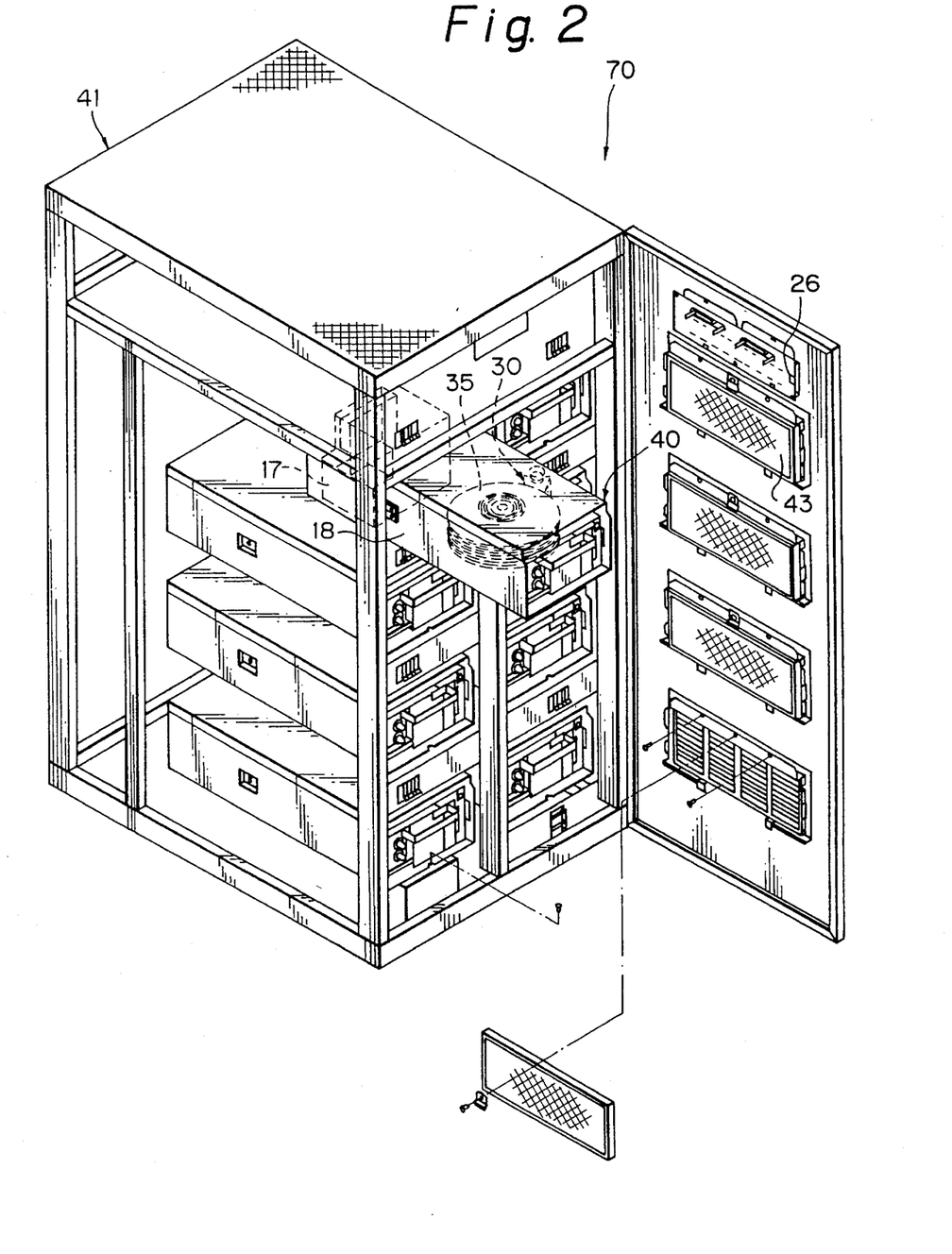
FIG. 2 is a perspective view showing an appearance of a plurality of magnetic disk array devices to which the present invention is applied.

Preferably, the present invention is adapted to a disk array device 70 as shown in FIG. 2, wherein a plurality of magnetic disk drives 40 each including a number of disks 35 are provided. The reference numeral 41 denotes a housing that can accommodate the plurality of magnetic disk drives 40. To be more specific, the disk array device 70 is composed of eight data storage disk drives, one parity disk drive and one spare storage disk drive.

Each of the magnetic disk drives 40 constituting each unit of disk array device 70 includes a disk module 18. The disk module 18 serves to contain the disks 35 and a power supply box 17 inside the disk module 18 per se.

Further, each magnetic disk drive 40 is constructed to be easily inserted into the housing 41 and also easily removed therefrom, so that a maintenance operation can be rapidly performed when a failure has occurred.

Figure 3:
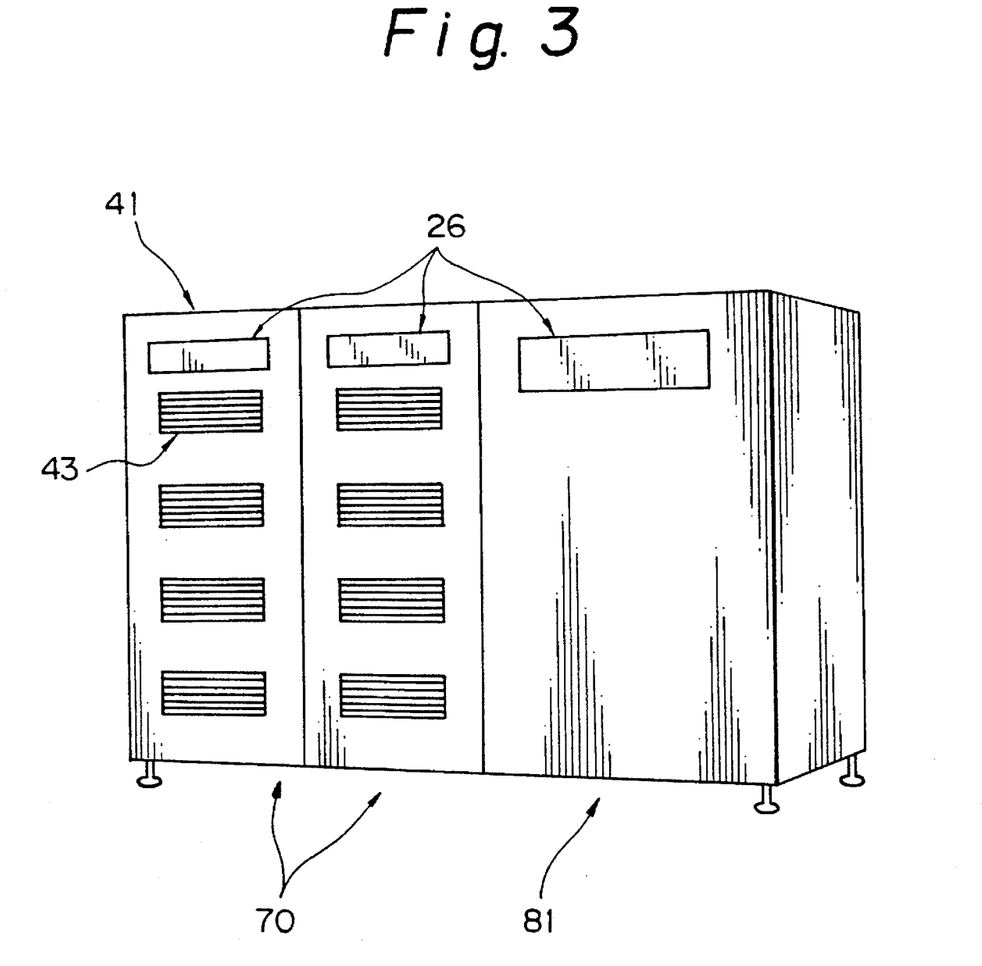
FIG. 3 is an assembly view showing an overall magnetic disk array device.

Further, in order to clarify the whole construction of a disk array system to which the present invention is applied, an appearance of a plurality of disk array devices 70 each including an operation panel 26 is illustrated in FIG. 3.

In FIG. 3, the disk array system constituted by a plurality of disk array devices, e.g., two disk array devices 40, and a disk array controller 81 is arranged to be contained in the housing 41. In this case, the front side of the housing 41 at each disk array device 70 is provided with the operation panel 26, in addition to a plurality of ventilation window 43 for radiating heat generated from a plurality of disk drives (not shown in FIG. 3). Further, the front side of the housing 41 at the disk array controller 81 is also provided with the operation panel 26.

Figure 4:
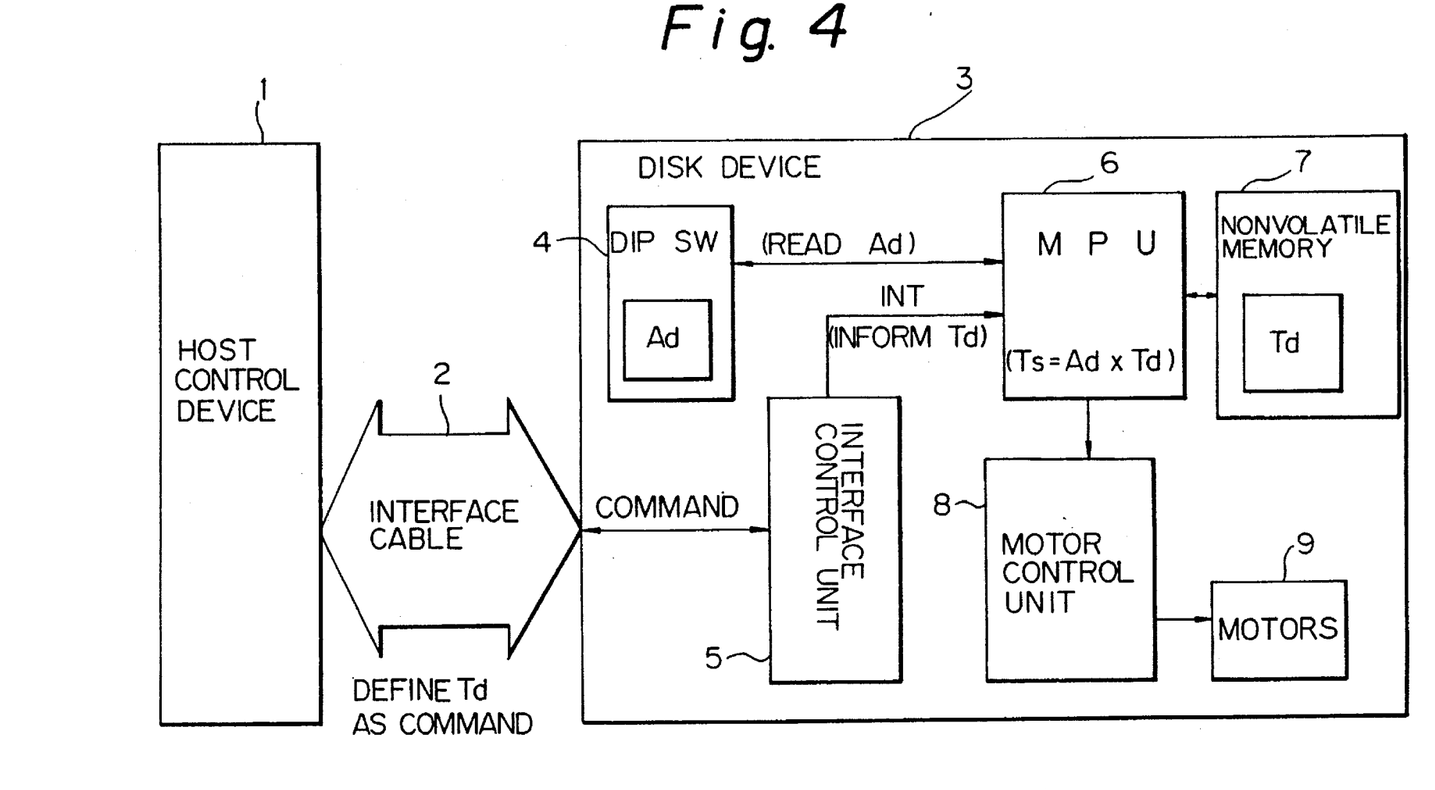
FIG. 4 is a block diagram for explaining the principles of the present invention.

FIG. 4 is a block diagram for explaining the principles of the present invention. In FIG. 4, indicated at numeral reference 1 is a host control device, indicated at numerical reference 2 is an interface cable, indicated at numerical reference 3 is a disk device, indicated at numerical reference 4 is a dip switch (Dip SW), indicated at numerical reference 5 is an interface control unit, indicated at numerical reference 6 is a MPU (microprocessor unit), indicated at numerical reference 7 is a nonvolatile memory, indicated at numerical reference 8 is a motor control unit, and indicated at numerical reference 9 is a motor. The symbol $A_d$ denotes a device number set value, the symbol $T_d$ denotes a motor activation start time delay, and the symbol $T_s$ denotes motor activation start time.

To solve the problems in the prior art the present invention adopts the following structure.

(1) In a method of controlling activation of a motor of a disk device, within the disk device (3) having a motor (9), based on a device number set value ($A_d$) which is determined exclusively for the disk device and motor activation start time delay $T_d$ which is designated by a host control device 1, motor activation start time $T_s$ which corresponds to the physical device number is calculated to thereby control activation of the motor 9, and the motor activation start time delay $T_d$ is set as a command in an interface between the disk device 3 and the host control device (1).

(2) In the structure of (1), the nonvolatile memory 7 is mounted in the disk device 3. When the motor activation start time delay $T_d$ is set as a command from the host control device 1, the disk device 3 stores the motor activation start time delay $T_d$ in the nonvolatile memory 7. When controlling activation of the motor later, the disk device 3 requires that the motor activation start time $T_s$ for the motor 9 is calculated from the information $T_d$ which is stored in the nonvolatile memory 7 and that the motor 9 is activated in accordance with the motor activation start time $T_s$.

The function of the structure as above according to the present invention will be described with reference to FIG. 4.

First, in response to a command from the interface, the host control device 1 defines the motor activation start time delay $T_d$ at a bus bit (BUS bit).

Next, the interface control part 5 analyzes the command and generates an interruption signal INT which will be given to the MPU 6 to inform the MPU 6 of the motor activation start time delay $T_d$. The MPU 6 then stores the informed motor activation start time delay $T_d$ in the nonvolatile memory 7.

The motor activation start time delay $T_d$ is stored in the manner as above. This operation needs be performed only once after the system has been installed. The motor activation start time delay $T_d$, once stored in the nonvolatile memory 7, would not be lost even if electric power supply is cut off. Hence, in operations that follow, it is only necessary to read the information which is stored in the nonvolatile memory 7.

Normal operations are performed with the motor activation start time delay $T_d$ thus stored in the nonvolatile memory 7 as described above. During the normal operation, the disk device 3 controls activation of the motor 9 upon detection of supply of electric power thereto or receipt of a motor activation command from the host control device 1. The control of activation of the motor by the disk device 3 is performed in the following manner.

First, the MPU 6 reads a device number set value $A_d$ of a dip switch (Dip SW) 4. The MPU 6 then reads the motor activation start time delay $T_d$ which is stored in the nonvolatile memory 7.

Following this, the MPU 6 multiplies the device number set value $A_d$ by the motor activation start time delay $T_d$ to thereby calculate the motor activation start time $T_s$. In other words, the motor activation start time $T_s$ is found by multiplication $T_s = A_d \times T_d$.

Next, the MPU 6 monitors the motor activation time. When the motor activation start time arrives, the MPU 6 provides the motor control unit 8 with an instruction in response to which the motor control unit 8 drives the motor 9.

In this manner, according to the method above, the motor activation start time delay $T_d$ for the disk device can be set at any desired value by the host control device 1. Thus, the present invention is flexible and hence applicable to any kind of disk device (i.e., subsystem).

In addition to this, since once the motor activation start time delay $T_d$ is designated by the host control device 1, the information about the motor activation start time delay $T_d$ will be stored in the nonvolatile memory, in subsequent operations, it is possible that in each disk device, based on the information which is stored in the nonvolatile memory, the motor activation start time $T_s$ is automatically calculated in accordance and the time to activate the motor is determined in each disk device.

FIGS. 5 to 10 are views which show the embodiment of the present invention. In FIGS. 5 to 10, elements similar to those previously described with reference to FIG. 4 are denoted by the same reference numerals.

Figure 5:
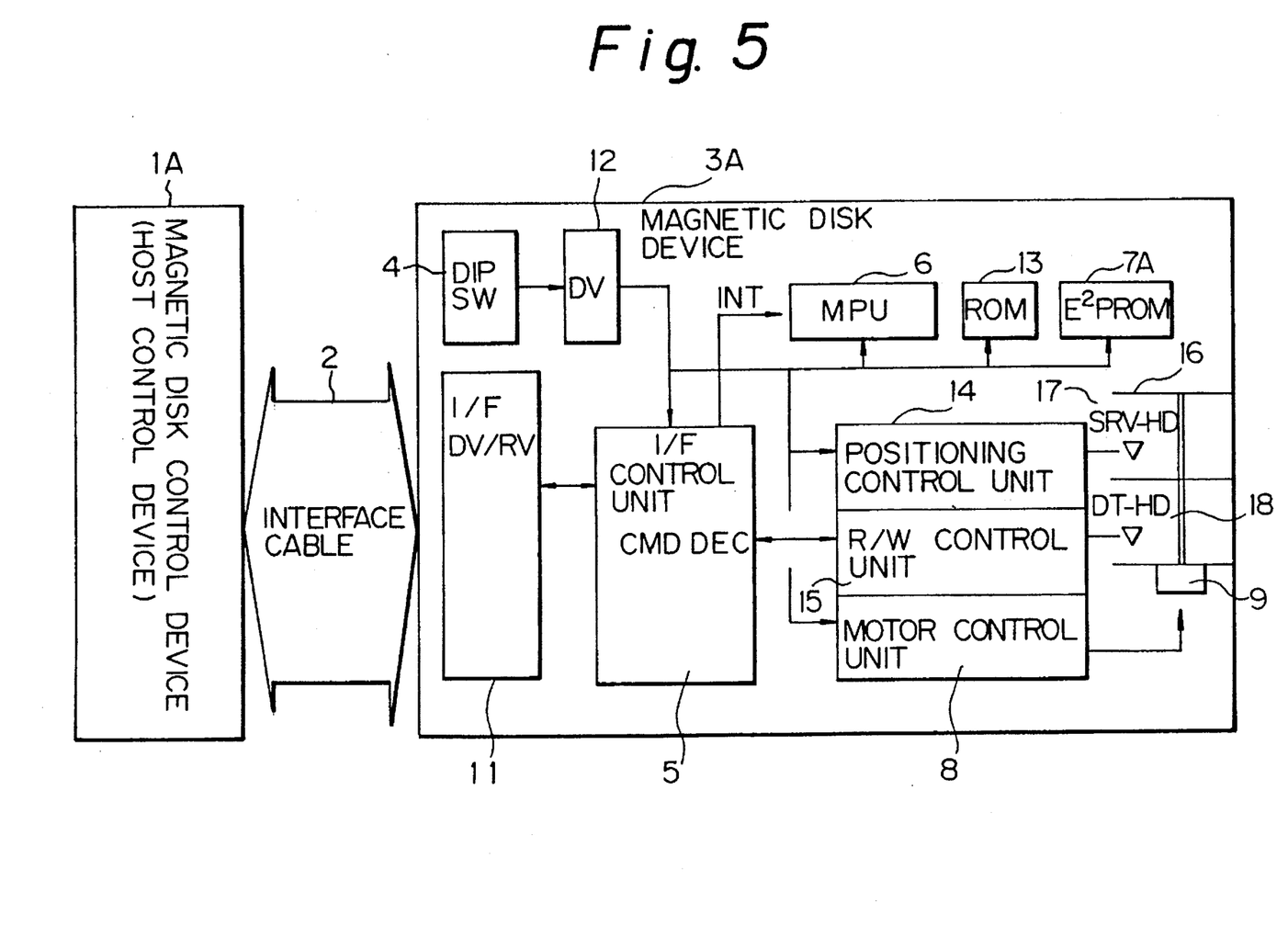
FIG. 5 is a block diagram showing the structure of the magnetic disk device according to the embodiment of the present invention.

A magnetic disk control device is indicated at reference character 1A, a magnetic disk device is indicated at reference character 3A, an E²PROM (Electrically Erasable Programmable Read Only Memory) is indicated at reference character 7A, an interface driver/receiver (I/F DV/RV) is indicated at reference numeral 11, a driver (DV) is indicated at reference numeral 12, a ROM (Read Only Memory) is indicated at reference numeral 13, an alignment decision control unit is indicated at reference numeral 14, a read/write control part is indicated at reference numeral 15, a magnetic disk is indicated at reference numeral 16, a servo head (SRV-HD) is indicated at reference numeral 17, and a data head (DT-HD) is indicated at reference numeral 18.

This embodiment is suitable for a magnetic disk device as described below in detail.

(Explanation of Structure of Magnetic Disk Device) ... FIG. 5

The structure of the magnetic disk device according to the embodiment of the present invention is shown in FIG. 5. As shown in FIG. 5, the magnetic disk device 3A comprises the interface driver/receiver 11, the interface control unit 5, the dip switch (Dip SW) 4, the driver 12, the MPU (microprocessor) 6, the ROM 13, the E²PROM 7A, the alignment decision control part 14, the read/write control part 15, the motor control unit 8, the motor 9, the magnetic disk 16, the servo head (SRV-HD) 17, the data head (DT-HD) 18 and etc.

The magnetic disk device 3A is connected to the magnetic disk control device (i.e., host control device) 1A by the interface cable 2.

The dip switch 4 is a switch for setting the device number of each magnetic disk device (i.e., device number set value $A_d$), and the E²PROM 7A is a memory for storing the motor activation start time delay $T_d$. The interface control unit 5 performs various kinds of interface control as well as decoding of a command (CMD DEC) and the like.

The MPU 6 reads a program which is stored in the ROM 13 to perform various kinds of control and etc. Control of activation and the like of the motor 9 are also performed by the MPU 6 in accordance with the motor activation start time which is calculated by the MPU 6.

On the other hand, the magnetic disk control device 1A governs various operations of the magnetic disk device 3A. One of the functions performed by the magnetic disk control device 1A is to set the motor activation start time delay as a command.

Although FIG. 5 shows only one magnetic disk device, in most cases, a plurality of magnetic disk devices 3A are connected to one magnetic disk control device 1A and the magnetic disk control device 1A provides the plurality of magnetic disk devices 3A with the command above.

Figure 6:
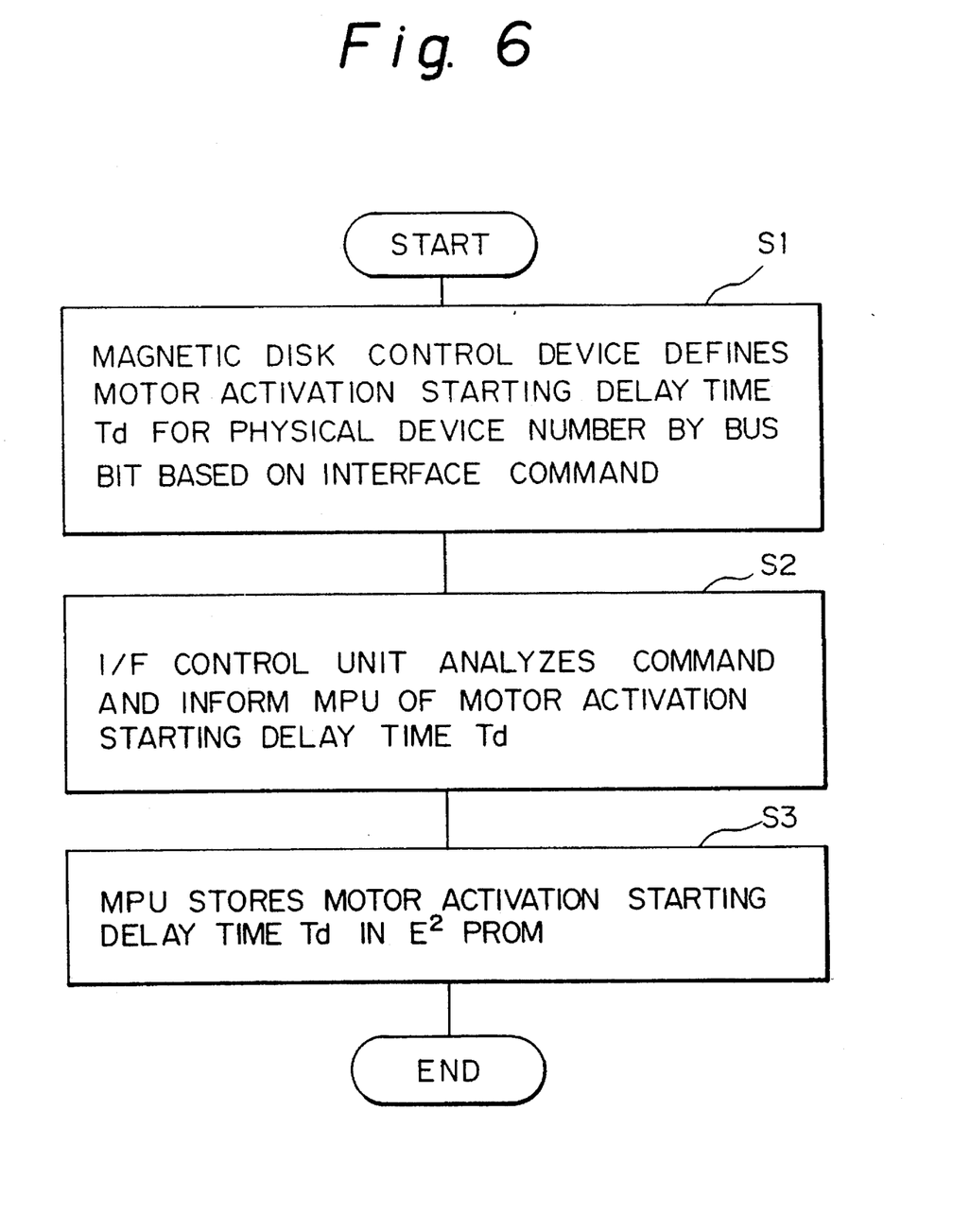
FIG. 6 is a flow chart showing the procedures performed in the embodiment of the present invention (Flow chart No. 1)
Figure 7:
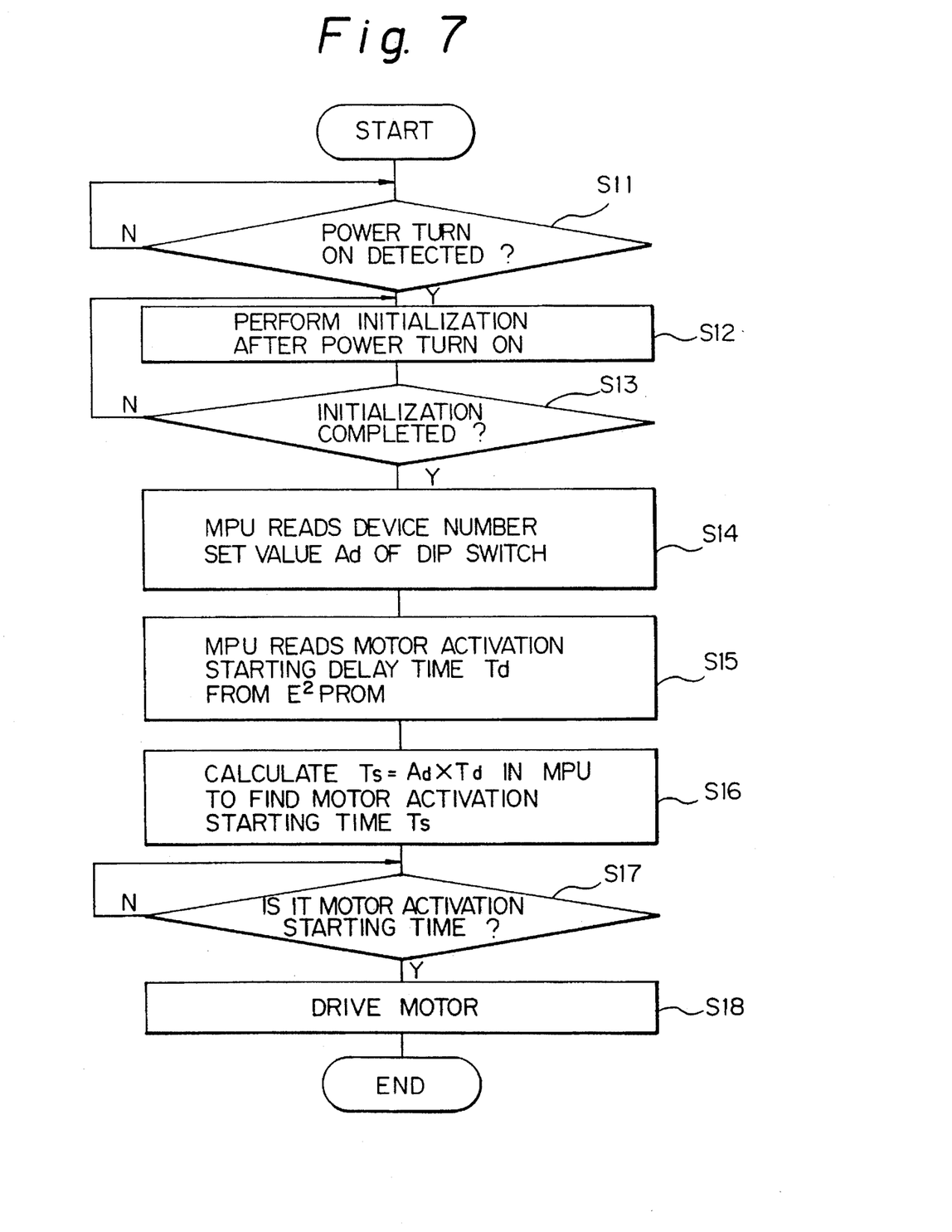
FIG. 7 is a flow chart showing the procedures of the present embodiment of the present invention (Flow chart No. 2)
Figure 8:
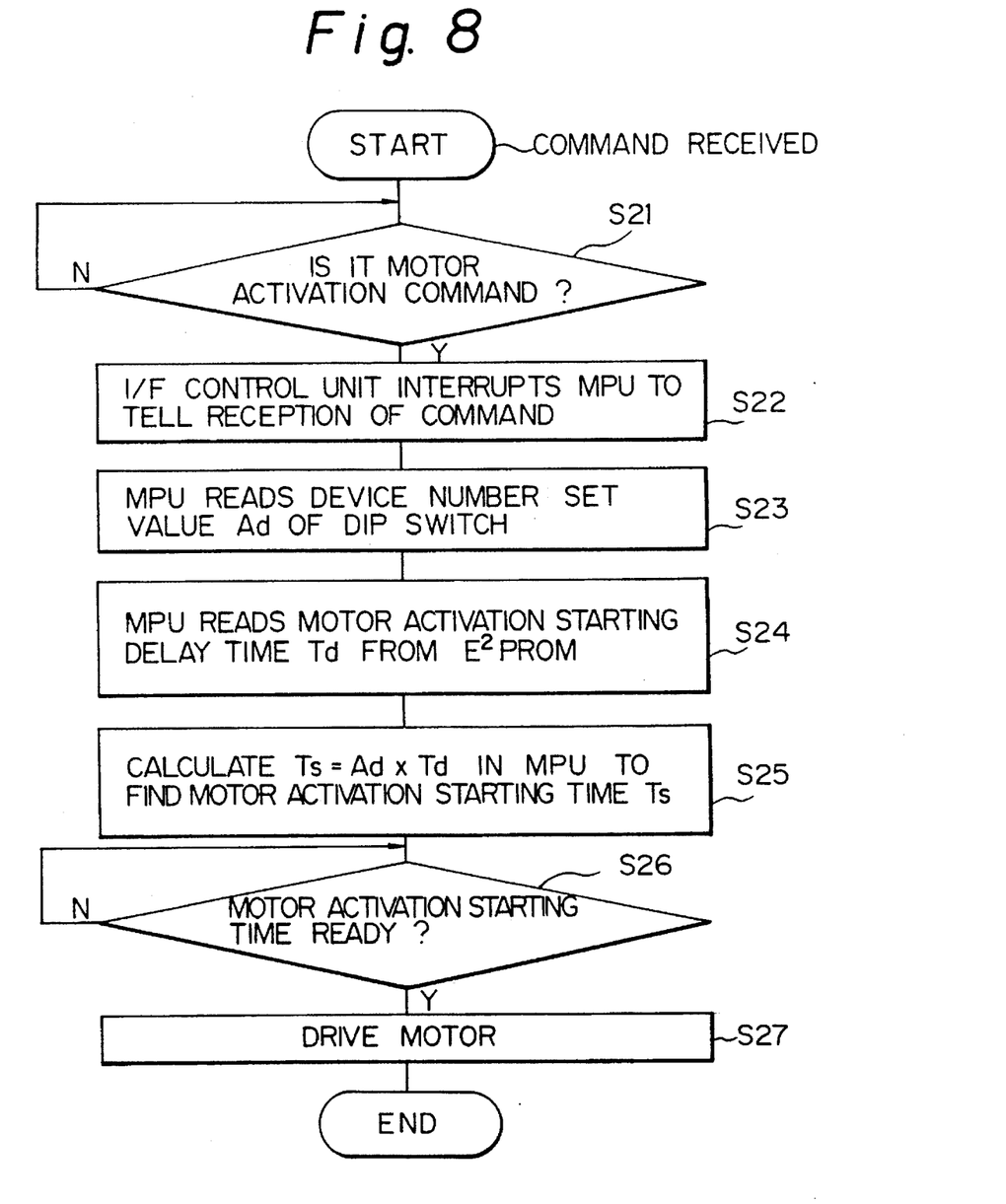
FIG. 8 is a flow chart showing the procedures of the embodiment of the present invention (Flow chart No. 3)

(Explanation of Motor Activation Control Method) ... FIGS. 6 to 8

FIG. 6 is a flow chart showing the procedures performed in the present embodiment (Flow chart No. 1) (Storing of data into E²PROM), FIG. 7 is another flow chart showing the procedures of the present embodiment (Flow chart No. 2) (Procedure 1 at activation of the motor), and FIG. 8 is still another flow chart showing the procedures of the present embodiment (Flow chart No. 3) (Procedure 2 at activation of the motor). In the following description, the numbers of the respective process steps shown in FIGS. 6 to 8 will be parenthesized.

①: Explanation of Storing Motor Activation Start Time Delay $T_d$ in E²PROM ... FIG. 6

In performing the following procedures, first, as a command of the interface 2, a command code or a control signal for setting the motor activation start time delay $T_d$ for the physical device number of each magnetic disk device 3A is set.

Following this, the magnetic disk control device 1A defines the motor activation start time delay $T_d$ at a bus bit (BUS bit) in response to the command from the interface (i.e., interface cable 2) (S1).

Next, the interface control unit 5 analyzes the command which is received through the interface driver/receiver 11. The interface control unit 5 then provides the MPU 6 with an interruption signal INT to inform the MPU 6 of the motor activation start time delay $T_d$ (S2). The MPU 6 stores the motor activation start time delay $T_d$ in the E²PROM 7 (S3).

In the same manner as above, the motor activation start time delay $T_d$ is stored. This operation needs be performed only once after the system has been established, for example, when the magnetic disk devices are shipped from the factory or when the magnetic disk devices are tested upon delivery to and received by the user.

The motor activation start time delay $T_d$, once stored in the E²PROM 7A, would not be lost even if electric power supply is cut off. Hence, in the procedures that follow, it is only necessary to read the information which is stored in the E²PROM 7A.

②: Explanation of Procedure 1 at Activation of the Motor ... FIG. 7

This procedure is related to the case where the magnetic disk device starts activating the motor by itself after electric power is supplied to the magnetic disk device, and therefore, performed under a condition where the procedure ① is complete.

First, upon detection of supply of electric power thereto (S11), the magnetic disk device 3A performs post-power-on initializing (S12).

When the post-power-on initialization is finished (S13), the MPU 6 reads the device number set value $A_d$ set at the dip switch (Dip SW) 4 (S14). The MPU 6 then reads the motor activation start time delay $T_d$ which is stored in the E²PROM 7A (S15).

Following this, the MPU 6 performs multiplication of the device number set value $A_d$ and the motor activation start time delay $T_d$ to calculate the motor activation start time $T_s$ (S16). That is, the motor activation start time $T_s$ is calculated by multiplication $T_s = A_d \times T_d$.

Next, the MPU 6 monitors the motor activation time. When the motor activation start time has come (S17), the MPU 6 supplies the motor control unit 8 an instruction in response to which the motor control unit 8 drives the motor 9 (S18).

③: Explanation of Procedure 2 at Activation of the Motor ... FIG. 8

This procedure is related to the case where the magnetic disk device starts activating the motor in response to a motor activation command which is received from the host control device 1A, and therefore, performed under a condition where the procedure ① is complete.

The host control device 1A outputs the motor activation command which will be received by the magnetic disk device 3A and thereafter analyzed by the interface control unit 5. If this command is found to be the motor activation command as a result of the analysis (S21), the interface control unit 5 interrupts the operation of the MPU 6 to inform the MPU that the motor activation command has been received (S22).

Informed of the receipt of the motor activation command, the MPU 6 reads the device number set value $A_d$ of the dip switch (Dip SW) 4 (S23). Following this, the MPU 6 reads the motor activation start time delay $T_d$ which is stored in the $E^2$PROM 7A (S24).

The MPU 6 then performs multiplication of the device number set value $A_d$ and the motor activation start time delay $T_d$ (S25) to calculate the motor activation start time $T_s$. In other words, the motor activation start time $T_s$ is calculated by the multiplication $T_s=A_d\times T_d$.

Next, the MPU 6 monitors the motor activation time. When the motor activation start time has come (S26), the MPU 6 provides the motor control unit 8 with an instruction in response to which the motor control unit 8 drives the motor 9 (S27).

In this manner, the activation start time for the motor 9 is determined and the motor is activated in each magnetic disk device. In this case, a plurality of magnetic disk devices 3A are connected to one magnetic disk control device 1A and the device number of each disk device 3A is set at the dip switch 4 of each magnetic disk device 3A.

For instance, assume that n magnetic disk devices DV0, DV1, DV2, . . . DVn are connected and that the device number set values $A_d$ for the respective devices are set as "0" for the device DV0, "1" for the device DV1, "2" for the device DV2, . . . and "n" for the device DVn.

In such a case, since the motor activation start time $T_s$ for each one of the magnetic disk devices DV0, DV1, DV2, . . . DVn is determined by $T_s=A_d\times T_d$, it then follows that $T_s=A_d\times T_d=0\times T_d=0$ for the magnetic disk device DV0, $T_s=A_d\times T_d=1\times T_d=T_d$ for the magnetic disk device DV1, $T_s=A_d\times T_d=2\times T_d=2T_d$ for the magnetic disk device DV2, . . . and $T_s=A_d\times T_d=n\times T_d=nT_d$ for the magnetic disk device DVn.

More precisely, the magnetic disk devices DV0, DV1, DV2, . . . DVn serially start activating the motors mounted therein at the time 0, $T_d$, $2T_d$, . . . $nT_d$, respectively.

Thus, the plurality of magnetic disk devices start activating the associated motors one by one with a delay of $T_d$ between successive motor activations. Hence, a large load will not be created unlike in the prior art technique. In determining the motor activation start time delay $T_d$, the power source capacity and other factors are taken into consideration.

Figure 9:
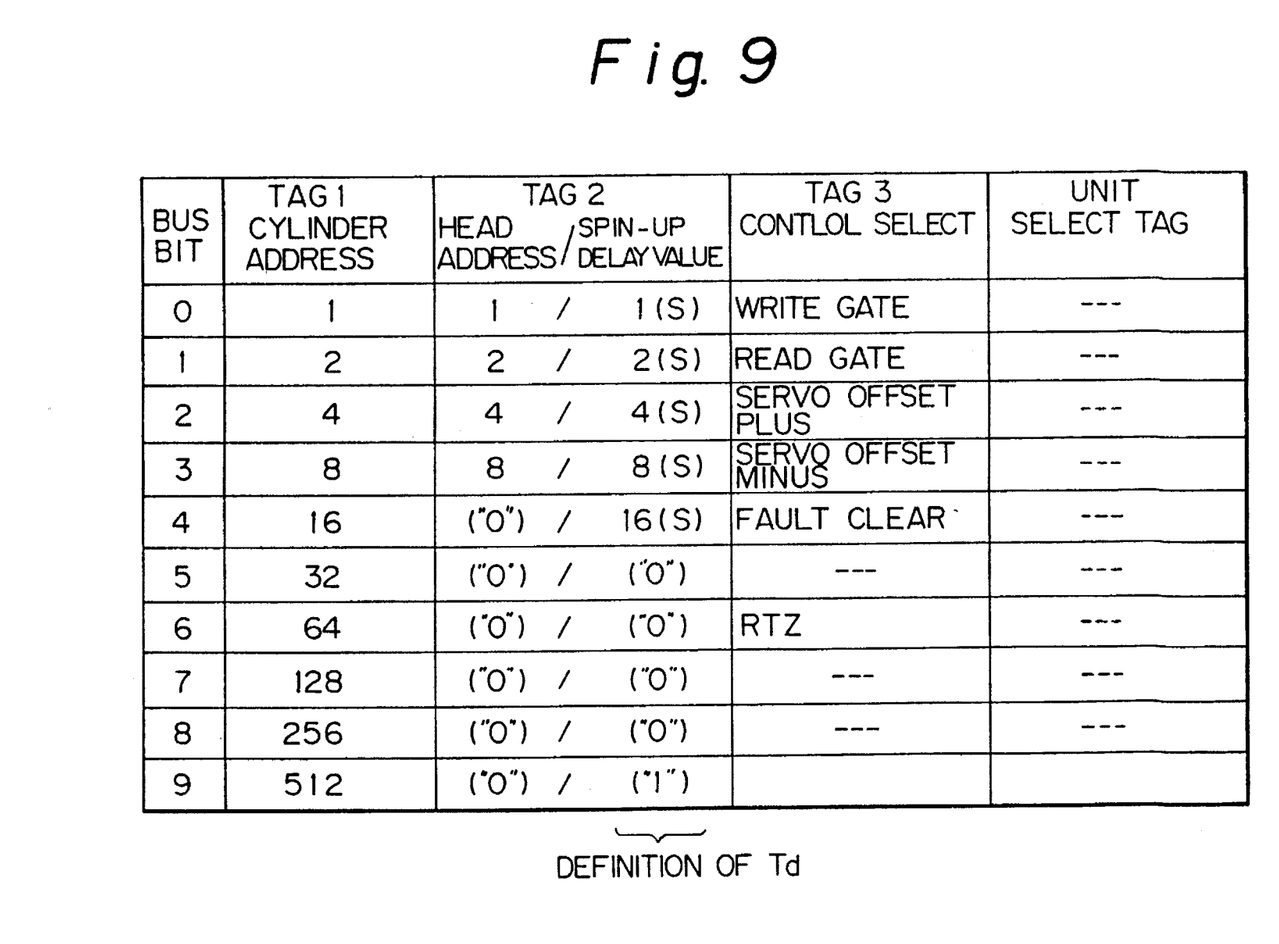
FIG. 9 shows Example 1 of command definitions in the embodiment of the present invention.
Figure 10:
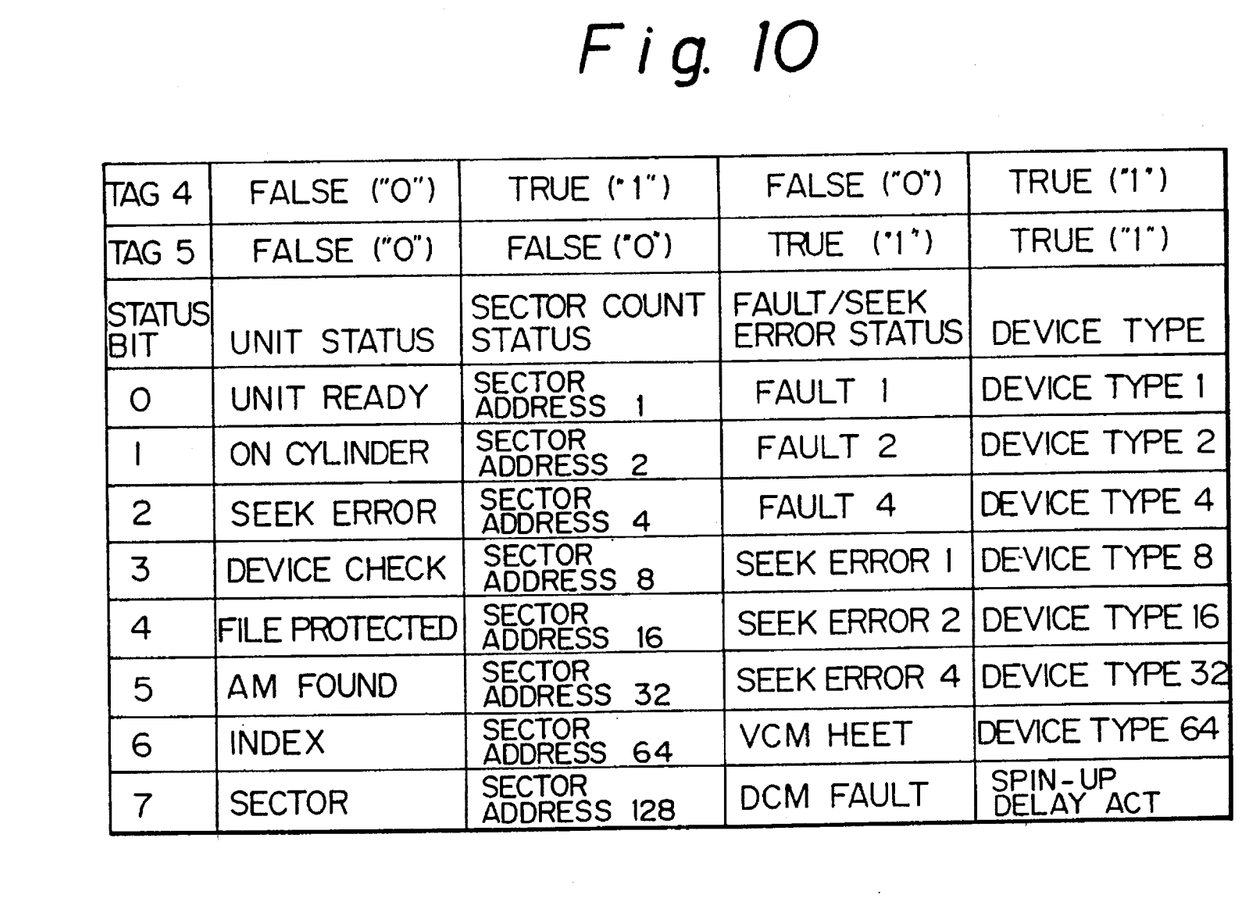
FIG. 10 shows Example 2 of command definitions in the embodiment of the present invention.

(Explanation on Example of Command Definitions on Interface between Magnetic Disk Control Device and Magnetic Disk Devices) . . . FIGS. 9 and 10

The example of command definition described below concerns where an SMD (Storage Module Disk) interface is used (an SMD interface is an interface which is used with a regular OEM magnetic disk device or the like).

①: Explanation of Example 1 of Command Definitions (Information about Interface Tag/BUS Line) . . . FIG. 9

FIG. 9 is a table showing Example 1 of Command Definitions (information about the interface Tag/BUS line). In Example 1, commands are defined by combinations of Tag 1, Tag 2, Tag 3 and BUS bits 0 to 9.

In this example, combinations of Tag 1 and BUS bits 0 to 9 define cylinder addresses while combinations of Tag 2 and BUS bits 0 to 9 define head addresses. On the other hand, combinations of Tag 3 and BUS bits 0 to 9 define control.select information (i.e., write gate, read gate, servo offset direction, etc.).

In this case, of the combinations of Tag 2 and BUS bits 0 to 9, for example, the combination involving Bus bit 9 is not used usually. Hence, this bit is used to define the command which defines the motor activation start time delay $T_d$.

More particularly, among the combinations of Tag 2 and BUS bits 0 to 9, if Bus bit 9 is "0", BUS bits 0 to 9 define the head addresses (the head addresses are defined using bits 0 to 3 in this example and therefore bit 9 is not used). If Bus bit 9 is "1" to the contrary, BUS bits 0 to 9 define the motor activation start time delays (i.e., Spin-up Delay Value).

If Bus bit 9 is "1" in the combinations of Tag 2 and BUS bits 0 to 9, the motor activation start time delays (i.e., Spin-up Delay Value) are defined by the combinations involving BUS bits 0 to 4 in this example. In FIG. 9, the symbol (S) denotes units of seconds (i.e., Second).

In the manner as above, the motor activation start time delays (Spin-up Delay Value) are defined in the form of command in the interface 2.

②: Explanation on Example 2 of Command Definitions (Status Line Information Using Tag 4 and Tag 5) . . . FIG. 10

FIG. 10 is a table showing Example 2 of Command Definitions (status line information using Tag 4 and Tag 5). Commands are defined by combinations of Tag 4, Tag 5 and BUS bits 0 to 7.

In FIG. 10, the symbols "Tag 4" and "Tag 5" denote information to be sent from the magnetic disk control device 1A to the magnetic disk devices 3A. The status bits (Status bit) 0 to 7 represent sense status information to be sent from the magnetic disk devices 3A to the magnetic disk control device 1A.

For instance, where Tag 4="1" and Tag 5="1", the status bit (Status bit) 7 expresses status information (Spin-up Delay Act) which indicates whether the motor activation start time delay (Spin-up Delay Value) is set in the $E^2$PROM 7A (the status bit 7 of "1" indicates that the motor activation start time delay has been already set and the status bit 7 of "0" indicates that the motor activation start time delay has not been set).

Figure 11:
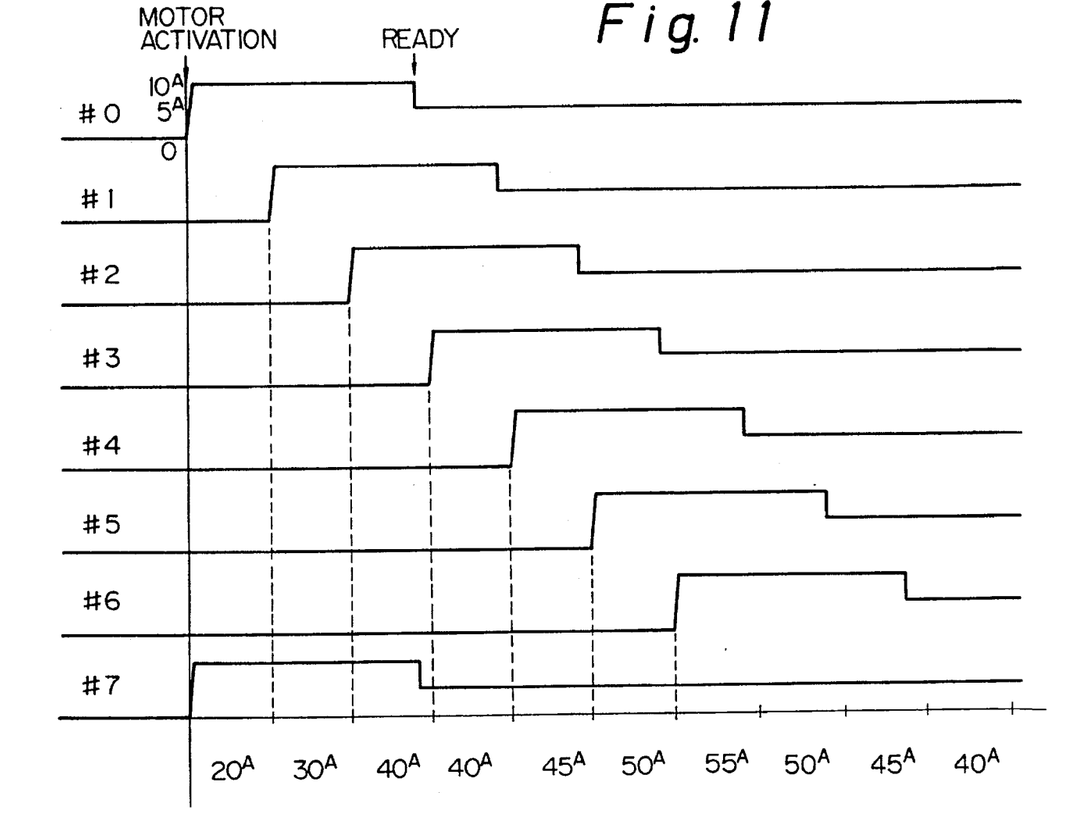
FIG. 11 is a waveform diagram showing the operation of a plurality of motors in a time of activation.

FIG. 11 is a current waveform diagram showing the sequential operation of a plurality of motors.

When the power supply is turned ON in sequence, the consumption of the power is remarkably reduced by the reduction of such current and the capacity of the system power supply can be designed for better in a small-sized and smart way. Since the delay time may be prolonged in response to the capacity of the power supply, the rising current waveform can be reduced.

Although the foregoing has described the present invention in relation to the embodiment above, the following is also possible.

(1) The present invention is applicable not only to magnetic disk devices but to optical disk devices as well.

(2) As the interface, not only the SMD interface used in the embodiment above but also other types of interface may be used.

As described above, the present invention has the following effects.

(1) It is possible that the motor activation start time delays for the disk devices can be set at any desired values by the host control device. Hence, the present invention is flexible and applicable to any kind of disk device (i.e., subsystem).

(2) Once the motor activation start time delay is designated by the host control device 1, the information about the motor activation start time delay will be stored in the nonvolatile memory. Hence, in subsequent operations, it is possible that in each disk device, based on the information stored in the nonvolatile memory, the motor activation start time delay is automatically calculated in accordance with which activation of the motor is controlled in each disk device.

As a result, a load on the host control device is reduced, thereby enhancing the operation efficiency of the system.

(3) The motor activation start time delay is set and changed in an easy manner. Hence, the system is organized easily.

(4) Unlike in the prior art technique, it is not necessary to monitor time in the host control device, the power source unit or the like. Hence, loads on these devices are reduced.

We claim:

1. A method for controlling the activation of a plurality of disk devices, wherein each disk device has a motor, the method comprising the steps of:

determining a device number set value ($A_d$) determined exclusively for the disk device;

determining a motor activation start time delay ($T_d$) which is designated by a host control device;

determining a motor activation start time ($T_s$) which corresponds to the device number set value ($A_d$) to thereby control activation of the motor, wherein the motor activation start time delay ($T_d$) is set in the form of a command in an interface between the disk device and the host control device.

2. A method for controlling activation of a plurality of motors of disk devices in accordance with claim 1, wherein a nonvolatile memory is disposed in the disk device, and further comprising the steps of: storing the motor activation start time delay ($T_d$) in the non-volatile memory when the motor activation start time delay ($T_d$) is designated as a command from the host control device; and later controlling activation of the motor based on the motor activation start time ($T_s$) which is calculated from the information which is stored in the nonvolatile memory, to thereby control activation of the motor.

3. A method according to claim 1, wherein a microprocessor calculates the product of the device number set value $A_d$ and the motor activation start time delay $T_d$ to find the expression of the motor activation start time $T_s$ such that:

$$T_s = A_d \times T_d$$

4. A method for controlling the activation of disk drive motors in a disk device system having a power source, comprising the steps of:

detecting a supply of electric power from the power source to the motors;

detecting whether or not initialization has been completed;

reading, using a MPU, a device number set value set by a switch;

reading a motor activation start time delay stored in a memory;

calculating a predetermined expression in the MPU to find the motor activation start time;

monitoring the motor activation time to supply a motor control unit with an instruction to drive the motor.

5. A method for controlling the activation of disk drive motors, comprising the steps of:

receiving a motor activation command from a host control device;

interrupting the operation of the MPU by an interface control unit to inform the MPU of the reception of said motor activation command;

reading a device number set value based on a switch;

reading a motor activation start time delay stored in a memory;

performing a multiplication of the device number set value and the motor activation start time delay to calculate a motor activation start time; and monitoring the motor activation time to provide the motor control unit with an instruction to drive the motor.

6. A disk array system constituted by a plurality of disk array devices including motors comprising:

a host control device for defining a motor activation start time delay $T_d$ as a bus bit;

one of said plurality of disk array devices being connected to said host control device via an interface cable, each of said disk array devices including:

a switch for setting a device number set value;

a memory for storing the motor activation start time delay;

an interface control unit for effecting various kinds of interface control; and an MPU for reading a program stored in said memory.

* * * * *

UNITED STATES PATENT AND TRADEMARK OFFICE
CERTIFICATE OF CORRECTION

PATENT NO. : 5,488,274
DATED : January 30, 1996
INVENTOR(S) : Satoh

It is certified that error appears in the above-indentified patent and that said Letters Patent is hereby corrected as shown below:

Column 1, line 30, delete "②-a" and insert --①-a--.

Column 2, line 34, after "motors" insert --and--.

Signed and Sealed this

Twenty-ninth Day of April, 1997

Attest:

BRUCE LEHMAN

Attesting Officer     Commissioner of Patents and Trademarks